United States Patent [19]
Itoh et al.

[11] Patent Number: 4,719,088
[45] Date of Patent: Jan. 12, 1988

[54] APPARATUS FOR REMOVING AT LEAST ONE ACIDIC COMPONENT FROM A GAS

[75] Inventors: Fumio Itoh, Sakai; Tutomu Sasaki, Takarazuka; Ikuhisa Kanoh, Osaka; Takaaki Fukumoto, Kishiwada, all of Japan

[73] Assignees: Mitsubish Denki Kabushiki Kaisha, Tokyo; Taiyo Sanso Kabushiki Kaisha, Osaka, both of Japan

[21] Appl. No.: 828,124

[22] Filed: Feb. 11, 1986

[30] Foreign Application Priority Data

Feb. 12, 1985 [JP] Japan .................. 60-25402

[51] Int. Cl.⁴ .................. G05D 9/00; B01D 50/00
[52] U.S. Cl. .................. 422/106; 422/168; 422/169; 422/170
[58] Field of Search .................. 422/106, 191, 171, 168, 422/169, 170; 423/242 A

[56] References Cited

U.S. PATENT DOCUMENTS

| | | | |
|---|---|---|---|
| 1,156,022 | 9/1915 | Riis | 422/191 |
| 1,264,512 | 4/1918 | Hechenbleikner | 422/191 |
| 2,191,467 | 7/1940 | Haywood | 422/170 |
| 2,822,248 | 2/1958 | Harmony | 422/106 |
| 3,907,523 | 9/1975 | Melin Jr. | 422/170 |
| 4,096,586 | 6/1978 | Badertscher | 422/106 |
| 4,195,062 | 3/1980 | Martin et al. | 422/168 |

FOREIGN PATENT DOCUMENTS

50-43056 4/1975 Japan .
54-50486 4/1979 Japan .

Primary Examiner—Kenneth M. Schor
Assistant Examiner—Lori-Ann Cody
Attorney, Agent, or Firm—Armstrong, Nikaido, Marmelstein & Kubovcik

[57] ABSTRACT

Apparatus for removing an acidic component from a gas comprising two absorption columns for washing a crude gas by using two concentrations of alkali-containing aqueous solutions. The alkali-containing solution used in the first step has a pH of 6-13 and the solution used in the second step has a 0.3-2.5 N concentration. A specific gravity control device is used to control the concentration of the solution circulated for the second step. A pH control device is used to control the pH of the solution circulated for the first step. The pH control device controls a valve which regulates the addition of the second step solution into the tank of the first step solution as needed.

1 Claim, 2 Drawing Figures

APPARATUS FOR REMOVING AT LEAST ONE ACIDIC COMPONENT FROM A GAS

BACKGROUND OF THE INVENTION

1. Field of the Invention

This invention relates to a process for and an apparatus for removing at leaast one acidic component from a gas by treating waste gas containing the at least one acidic component such as hydrogen chloride, hydrogen fluoride, nitric acid, hydrogen sulfide, or sulfurous acid. Waste gases containing al least one acidic component are produced in various chemical industries, semiconductor industries and others.

2. Prior Art

It is conventinal to carry out a process for removing at least one acidic component from a waste gas by washing the gas with an alkali-containg solution to absorb the acidic component and neutralize the acid with alkali in order to remove the acidic component from the gas.

Different devices for carrying out an absorption operation involving gas-liquid contact reactions are also known prior to this invention. A packed column having various kinds of packing materials, a spray column, a scrubber, a cyclone scrubber, a wetted wall column, a plate column, a bubble column, a bubble-agitating column and the like are chosen and used independently or in combinaton in accordance with conditions which are required.

When the acidic gas such as hydrogen chloride or nitric acid is contained in the waste gas and the gas is discharged in the atmosphere, a white fume occurs due to an acid mist even if the coefficient of removal of the acidic gas reaches 70-90%. Therefore, even if the value of the environmental or hygienic standard is achieved numerically, the occurance of a white fume is not always sufficient to satisfy all people. A technique for removing the acidic components from such waste gas to a substantially zero level of content has been searched for. However, it has been difficult to develop means to meet all of the requirements on economic basis, to enable continuous operation over a long term and to practice the process in a small space.

When washing a gas containing acidic component(s) by using an alkali-containing aqueous solution of relatively high concentration in some kinds of absorption columns, absorption and removal of the acidic component(s) may be effectively carried out. However, a salt such as an alkali carbonate is produced by reaction between carbon dioxide in the gas and the alkali and then deposited or precipitated and piled up in the column thereby making operation impossible at all. Therefore, such process not only requires a periodical complicated washing operation but also provides a disadvantage of discharging the alkali-containing aqueous solution as waste during the washhing operation, even though the alkali-containing aqueous solution has a fairly high concentration.

A process for washing an acid gas-containing gas with a low concentration of an alkali-containing aqueous solution was tried, but the process was not sufficient to remove the acid gas by using the alkali-containing aqueous solution of low concentration to an extent such as not to precipitate alkali carbonate crystals. A white fume was apt to occur when the processed gas is discharged into the atmosphere. Extension of residence time of the waste gas has been tried in order to prevent occurance of such a white fume. It was necessary to enlarge the absorption column or to connect a number of columns in series to make a multistage system. As a consequence, the overall size of the apparatus becomes larger and pressure loss increases thereby causing an increase of running cost.

OBJECT OF THE INVENTION

This invention aims at solving the above noted problem due to precipitation or deposition of an alkali carbonate or the like in the gas processing process for removing at least one acidic component is a gas by washing the gas with an alkali-containing aqueous solution. Further, it is an object of the invention to avoid the problems of the apparatus becoming larger or the alkali-containing aqueous solution being discarded as waste and at the same time to provide a compact apparatus suitable for practicing the processs for removing the at least one acidic component from the gas effectively.

SUMMARY OF THE INVENTION

The first aspect of the invention concerns a process for removing at least one acidic component from a gas by washing the gas with an alkali-containing aqueous solution to absorb and remove the acidic component which comprises carrying out washing and absorbing in two separated steps: the first step being where an alkali-containing aqueous solution of pH 6-13 is used as a washing agent, and the second step being where an alkali-containing aqueous solution of 0.3-2.5N concentration is used as a washing agent to absorb and remove any remaining portion of the acidic component in the gas.

The second aspect of the invention concerns an apparatus for removing at least one acidic component contained in a gas which comprises, for example, an absorption column A (defined as the A-column), ans absorption column B (defined as the B-column) and certain other structure as follows:

The A-column can be a first countercurrent gas-liquid contact absorption device having at least one first gas inlet, at least one first gas outlet, at least one first liquid inlet including a first sprayer means, and at least one first liquid outlet.

The B-column can be a second countercurrent gas-liquid contact absorption device having at least one second gas inlet connected to the at least one first gas outlet, at least one second gas outlet, at least one second liquid inlet including a second sprayer means, and at least one second liquid outlet.

A gas-introduction means is connected to the at least one first gas inlet for introducing a gas having at least one acidic component therein into the first absorption device.

A first tank means is provided for preparation and supply of high concentration alkali-containing aqueous solution, with the first tank means having a first tank outlet.

A second tank means is provided for preparation and supply of medium concentration alkali-containing aqueous solution, said second tank means having a second tank outlet.

A means connects the first tank outlet to the second tank means and includes a first controllable valve means.

First water supply means are connected to the second tank means and include a second controllable valve means.

A specific gravity control means is operatively associated with the second tank means and is connected to the first controllable valve means and the second controllable valve means for controlling the specific gravity and thus the concentration of the medium concentration alkali-containing aqueous solution within a range of about 0.3 to about 2.5N by adding high concentration solution thereto.

A first liquid level control means is operatively associated with the second tank means and is connected to the second controllable valve means for controlling the level of solution within the second tank means about a predetermined level.

A first recirculating means is connected between the second tank outlet and the at least one second liquid inlet and between the at least one second liquid outlet and the second tank means for circulating the medium concentration alkali-containing aqueous solution through the second absorption device to absorb remaining portions of the at least one acidic component from the gas. The first recirculating means includes first pump means disposed between the second tank outlet and the at least one second liquid inlet.

A third tank means is provided for preparation and supply of low concentration alkali-containing aqueous solution. The third tank means has a third tank outlet and a waste aqueous solution outlet means for discharging aqueous solution from the third tank means exceeding a second predetermined constant level in the third tank means.

A second water supply means is connected to the third tank means and includes a third controllable valve means.

A second liquid level control means is operatively associated with the third tank means and is connected to the third controllable valve means for controlling the level of solution within the third tank means.

A further means connects the first recirculating means downstream of the first pump means to the third tank means and has fourth controllable valve means therein for supplying medium concentration solution to the third tank means.

A pH control means is operatively associated with the third tank means and is connected to said fourth controllable valve means for controlling the pH of the low concentration alkali-containing aqueous solution within a range of about 6 to about 13 by adding medium concentration solution thereto.

A second recirculating means is connected between the third tank outlet and the at least one first liquid inlet and between the at least one first liquid outlet and the third tank means for circulating the low concentration alkali-containing aqueous solution through the first absorption device to absorb a major portion of the at least one acidic component from the gas.

First, second, and third agitator means can be provided in the first, second, and third tank means, respectively.

According to the first aspect of this invention, the process for washing the gas containing at least one acidic component with an alkali-containing aqueous solution to absorb the acidic component is divided into two steps. After the first step of washing the gas with an alkali-containing aqueous solution having a specific range of pH, the gas is washed again with an alkali-containing aqueous solution of specific range of concentration in the second step, so that the acidic component in the gas may be absorbed and removed substantially perfectly. Further, by re-using the alkali-containing aqueous solution once used in the second step for supplying for the consumed alkali in the first step, the alkali-containing aqueous solution may be used effectively and economically. As a result the above-mentioned various problems of the prior art may be solved at a stroke.

According to the second aspect of this invention, it becomes practicable to carry out easily and continuously absorption and removal of the at least one acidic component from the gas by means of a compact apparatus.

BRIEF DESCRIPTION OF THE DRAWINGS

The drawings show embodiments of this invention.

DETAILED DESCRIPTION OF THE INVENTION

This invention will be described in detail as follows.
To describe the process and the apparatus of this invention, an embodiment thereof is shown in FIG. 1.

Figure 1:
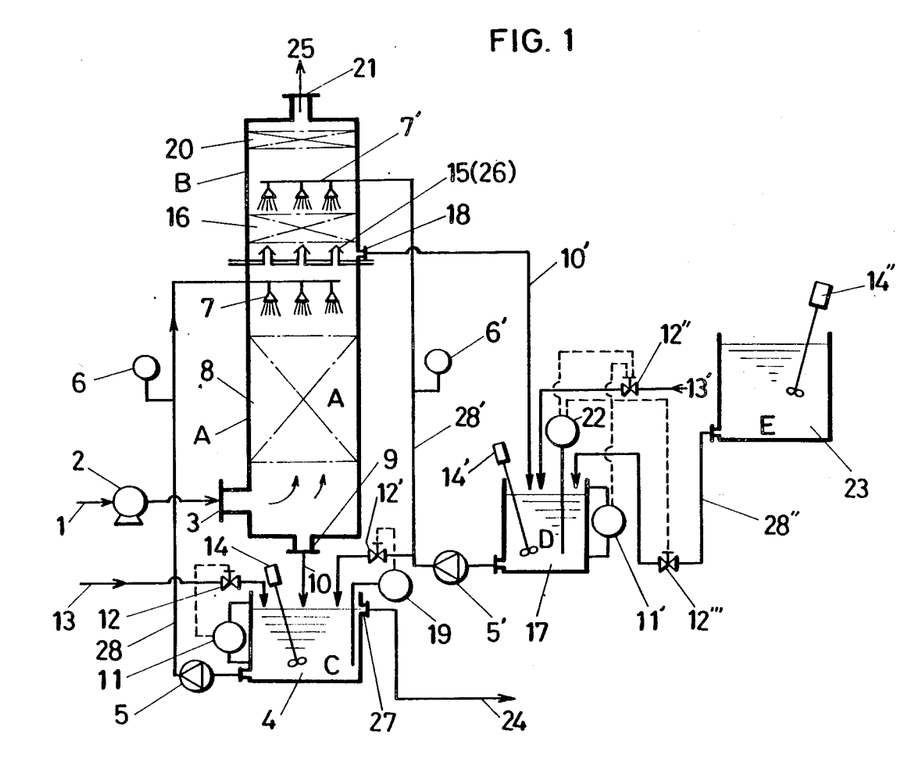
FIG. 1 is a flow chart showing an example of the process and the apparatus of this invention.

In FIG. 1, gas 1 containing at least one acidic component is blown into an absorption column A (A-column) be means of a blower 2 wherein washing in the first step is carried out with an alkali-containing aqueous solution of pH 6-13. The washing liquid in A-column may be water which does not contain alkali in the beginning of operation, but because the pH of the water rapidly becomes lower than 6 when the gas 1 containing an acidic component goes through the water it is necessary to supply an alkali in order to keep pH in a range of 6-13. Further, the reaction yielding an alkali carbonate is not inevitable and so it is preferrable to use an alkali-containing aqueous solution in the range of pH 6-7.

As the A-column absorption device 8, any conventional packed column, bubble column, and other gas-liquid contact device is usable in the washing absorption operation. It is sufficient to use a packed column or the like in consideration both of efficiency and economy.

The alkali-containing aqueous solution of pH 6-13 for washing is transported from a third tank C (C-tank) 4 to the top of the A-column by means of a pump 5 and then sprayed from sprayers 7 to contact the gas 1 containing an acidic component in the A-column absorption device 8, and then recycled via an A-column liquid outlet drain 9 back into C-tank 4.

The residual gas wherefrom most of the acidic component is removed in the first step or step in the A-column absorption device 8 is sent from the gas outlet of the A-column into an absorption column B (D-column) and then washed with an alkali-containing aqueous solution of concentration in the range of 0.3-2.5N to remove the remaining portions of the acidic component in the gas perfectly. Any mist contained in the gas is separated out as liquid drops by means of a mist separator 20. The processed gas 25 goes out from a processed gas outlet 21. As the B-column absorption device 16, any conventional gas-liquid contact devices may also be used in washing absorption operation. It is preferable to use those having high efficiency particularly in gas-liquid contact, for instance, a so-called spray demisters, packed columns which are packed with particlarly high efficient packing material and the like. The alkali-containing aqueous solution of concentration in the range of 0.3–2.5N to be used for washing is pumped up from a second tank D (D-tank) 17 by means of a pump 5' and sprayed from sprayers 7' disposed at an upper portion of the B-column absorption device 16. After the aqueous solution is contacted with the gas containing the acidic component in the B-column absorption device 16, the solution is recycled back into D-tank 17 via a B-column liquid outlet drain 18.

As the alkali of the alkali-containing aqueous solution to be used for washing the gas, the most popular alkalis such as, for example, hydroxide, hydrogen carbonate or carbonate of sodium or potassium alone or in combination thereof can be used. The use of sodium hydroxide is advantageous as a whole in consideration of the necessity for a decrease of deposit of carbonate crystals in the second step and from an economical view.

In the first step, an alkali-containing aqueous solution of pH 6–13 is used as a washing agent. This formulation depends upon the following reasons. We have found that on use of the acidic solution of pH lower than pH 6, little or no substantial absorption of the acidic component may be expected. On the other hand, on use of the aqueous solution of pH 6–7, absorption of the acidic component occured unexpectedly smoothly. Further, on use of alkaline aqueous solution of pH higher that 13, the residual useful alkali has to be abandoned uneffectively on drainage of the waste solution. In addition, on discharging the waste solution into a river or the like, water processing is required. It was found that little or no improvement of the absorption of the acidic component was obtained by use of alkali of pH a little above 13.

In the second step, an alkali-containing aqueous solution of 0.3–2.5N concentration is used as a washing agent. This formulation depends upon the following reasons. On use of an alkali-containing aqueous solution of concentration lower than 0.3N, absorption of the acidic component is insufficient and the control of the occurance of a white fume is difficult. Therefore, a concentration of higher than 0.3N is necessary to remove the acidic component perfectly. On the other hand, even though a higher alkali concentration in the alkali-containing aqueous solution, generally improves capture of the acidic component it is necessary to restrict the concentration of the alkali-containing solution below 2.5N because alkali absorbs and reacts with the carbon dioxide contained in the gas to yield an alkali carbonate which has little solubility in water in comparison with alkali hydroxide. When a high concentration of alkali is supplied into the aqueous solution while alkali carbonate concentration is elevated, there is apt to occur precipitation or deposition of carbonate. Consequently, it is necessary to control the concentration of the alkali-containing aqueous solution in consideration of this point. In conclusion, when suitable upper and lower limits of the alkali concentration are sumamrized, it is essential to use the alkali-containing solution in the range of 0.3–2.5N concentration. If the concentration goes out of the range, the process of this invention may not be practiced smoothly and well.

In the practice of this inventon, the aqueous solution as a washing agent absorbs the acidic component contained in the gas and lowers the pH of the solution or alkali concentration gradually respectively in the first step or the second step. Therefore, it is necessary to change the alkali-containing aqueous solution in C-tank 4 and D-tank 17 batchwise or continuously in portions in order to keep the respective solution in the above definite range of pH or concentration.

The alkali-containing aqueous solution of pH 6–13 used in the first step of this invention is so low in alkalinity in comparison with tkhe alkali-containing aqueous solution used in the second step, that it is convenient to supply the alkali-containing aqueous solution in D-tank 17 used in the second step into C-tank 4 used in the first step to maintain pH value within a certain controlling range when the alkali-containing aqueous solution in C-tank 4 absorbs the acidic component in the gas and the pH of the aqueous solution goes down out of the controlling range of Ph 6–13.

When the alkali-containing aqueous solution of 0.3–2.5N concentration in D-tank 17 used in the second step is used for gas washing and neutralized with the acidic component in the gas thereby reducing its alkalinity out of the above concentration range, it is convenient to supply the alkali-containing aqueous solution which is prepared in E-tank 23 where the alkali-containing aqueous solution of concentration higher than the alkali-containing aqueous solution in D-tank 17 into D-tank 17 to maintain the concentration of the alkali-containing aqueous solution in the D-tank 17 within the certain range.

In this manner, the process of this invention may be carried out smoothly by utilizing the alkali-containing aqueous solution used in the second step for supplying alkali consumed in the first step into the alkali-containing aqueous solution used in the first step.

We have invented an apparatus suitable for carrying out the process of this invention continuously. Concerning the apparatus, there are two embodiments: in one construction, an absorption column B (B-column) is mounted on an absorption column A (A-column); and in the other construction, the A-column is connected independently with B-column both using the A-column for the first step and the B-column for the second step in series.

Figure 2:
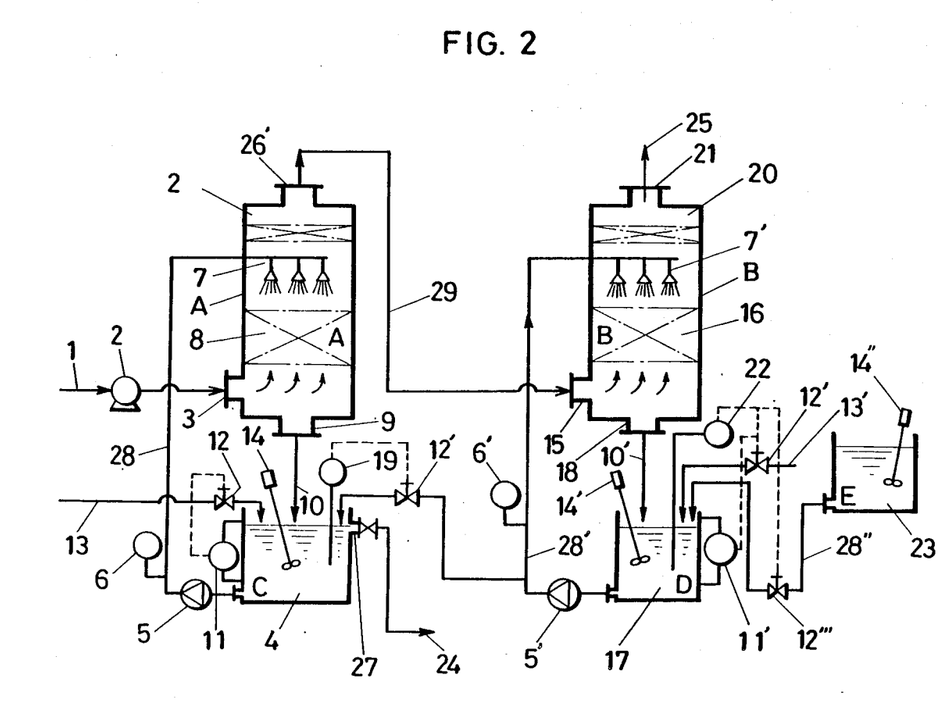
FIG. 2 is a flow chart showing another embodiment of the process and the apparatus of this invention.

Embodiments of these apparati are shown in FIGS. 1 and 2 respectively. The flow of the gas and also the flow of the alkali-containing aqueous solutions are common in both of the Figures and so an explanation is given for the representative embodiment shown in FIG. 1. As the flow of gas has already been explained with reference to FIG. 1, explanation about the flow of the alkali-containing aqueous solution will be given in the following description.

An alkali-containing aqueous solution of pH 6–13 is contained in C-tank 4, as shown in FIG. 1. The alkali-containing aqueous solution is sprayed by means of a sprayer 7 disposed near to hte top of A-column and within the interior of the column via a pump 5 and a liquid pipe 28. The sprayed solution contacts with the crude gas to absorb the at least one acidic component in the gas and to remove the at least one acidic component therefrom. Thereafter, the aqueous solution is recycled to C-tank 4 with its pH lowered. In this manner, the pH value in C-tank 4 is lowered. When the pH value drops below the lower limit of the controlling pH value, a pH control device disposed at C-tank 4 detects the drop of pH and operates to open a valve 12' which introduces into C-tank 4 the alkali-containing aqueous solutionn form D-tank 17 with alkalinity higher than the aqueous solution of C-tank 4. The alkali-containing aqueous solution in C-tank 4 is continuously agitated by means of an agitator 14 so as to keep the pH of the aqueous solution in C-tank 4 constant. In this manner, when the pH in C-tank 4 is recovered into the controlling range, the pH control device 19 operates to close the valve 12'. When the liquid level in C-tank 4 goes beyond an waste aqueous solution outlet 27, the alkali-containing aqueous solution in C-tank 4 goes beyond an waste aqueous solution in C-tank 4 flows over and out. When the liquid level of the alkali-containing aqueous solution in C-tank 4 drops down below the lower limit of the controlling range due to evaporation or other reasons, a liquid level control device 11 attached to C-tank 4 opens a valve 12 for introducing water from a water supply 13 so as to supply the water into C-tank 4. When the liquid level of C-tank 4 is recovered into the level of the controlling range, the liquid level control device 11 operates to close the valve 12. In this manner, the alkali-containing aqueous solution in C-tank 4 is substituted and changed continuously while keeping a desired range of controlling pH.

The alkali-containing aqueous solution having 0.3–2.5 N concentration is stored in D-tank 17. This alkali-containing aqueous solution is sprayed by a sprayer 7' arranged at the upper portion of interior of B-column via a pump 5' and a liquid pipe 28' to contact with the gas in order to absorb micro amounts of the at least one acidic component residual in the gas washing in A-column substantially perfectly and to neutralize acid which lowers the concentration of the alkali slightly in accordance with acid content and is recycled into D-tank 17. In this manner, the concentration of alkali in D-tank 17 is lowered gradually and drops below the lower limit of concentration to be controlled. A specific gravity control device 22 disposed at D-tank 17 detects the variation of concentration. As means for controlling a equivalent concentration (normality) of the alkali-containing aqueous solution, the specific gravity control device 22 is applied in the apparatus of this invention. Application of the specific gravity control device 22 depends upon our confirmation on finding as follows. Although absolute values of the specific gravity of alkali-containing aqueous solution vary depending upon the alkali and kind of the acidic gas, in a case where the acidic gas is washed with a certain alkali-containing aqueous solution, there is formulated a certain relationship between the equivalent concentration (normality) of the alkali-containing aqueous solution and the specific gravity of the solution. Thus, the control operation for concentration is simplified by applying detection of the specific gravity instead of detection of the equivalent concentration (normality) and in this case no problem occurs in the operation in practice.

In this circumstance, when the specific gravity control device 22 arranged at D-tank 17 detects drop of the alkali concentration in D-tank 17, the control device operaties to recover the alkali concentration by opening the valve 12''' for introducing into D-tank 17 the alkali-containing aqueous solution from E-tank 23 containing solution of an alkali cohcentration higher than that of the alkali-containing aqueous solution in D-tank 17. The alkali-containing aqueous solution in D-tank 17 is always agitated by an agitotor 14' to keep the concentration of the alkali-containing aqueous solution in D-tank 17 homogeneous. In this manner, when the specific gravity (in other words the concentration) of the alkali-containing aqueous solution in D-tank 17 is recovered into the controlling range, the specific gravity control device 22 operates to close the above valve 12'''. When the liquid level of the alkali-containing aqueous solution of D-tank 17 is lowered due to supply into the alkali-containing aqueous solution in C-tank 4, evaporation or the like, a liquid level control device 11' attached to D-tank 17 operates to open the valve 12'' and introduce water from a water supply 13'. When the liquid level of the alkali-containing aqueous solution in D-tank 17 is recovered to the level of the controlling range, the liquid level control device 11' operates to close the valve 12'' for water supply. Thus, the alkali-containing aqueous solution in D-tank 17 is changed and substituted continuously with maintaining desired controlling range of the concentration (specific gravity).

The alkali-containing aqueous solution of relatively higher concentration for supply has to be prepared always in E-tank 23 and no explanation will be required on the control of the concentration since it may be carried out suitably by one skilled in the art.

As the pH control device 19 as mentioned above, any kind of device available on market depending upon a principle of an glass electrode pH meter may be used.

As the specific gravity control device 22, any kind of device depending upon a principle of a density meter of vibration type or of float type, which are all in commerce may be used.

As the liquid level control devices 11 and 11', any kind of device such as float type, supersonic wave type pressure-sensitive type, electrostatic capacity type or the like which are all on the market may be used.

As the sprayers 7 and 7' for the alkali-containing aqueous solution, any conventional type such as spray nozzle, perforated plate, rotary spray plate or the like may be used.

On introducing the gas coming out of the top of A-column into B-column, if desires, a mist separator 20 may be provided at the top of A-column in order to prevent introducing low concentration of alkali-containing aqueous solution by entrainment into B-column. If desired, a mist separator 20 may be disposed at the top of B-column in order to prevent entrainment of the alkali-containing aqueous solution, by a gas coming out of B-column. As shown in FIG. 1, a conical cover plate above an intermediate gas inlet 15 (also utilized as an intermediate gas outlet 26) for introducing the gas from A-column into B-column in order to introduce only the gas ascending in A-column into B-column and to prevent the alkali-containing solution falling in B-column from dropping into A-column may be used. In this case, entrained splash impacts on the cover plate and drops back down into A-column and so the necessity of providing the mist separator 20 at the top of A-column may be reduced.

As shown in FIG. 2, in a case where A-column and B-column are separated independently, a mist separator 20 may be provided at each of the top of A-column and B-column, if necessary, or such a mist separator may be omitted in some cases. Even if a small amount of the alkali-containing solution from the A-column is entrained into B-column, there is no substantial variation in alkali concentration in B-column in practice since the control device is provided. Therefore in some cases reducing the cost of equipment by omitting the mist separator will be economically advantageous. In a case where the A-column and the B-column are constructed independently, as shown in FIG. 2, mist of the alkali-containing aqueous solution entrained by gas coming out of the intermediary gas outlet 26' at the top of A-column into the bottom of B-column via intermediate gas pipe 29, impacts onto the inner wall of the pipe to be converted into liquid flow. In such a case, it is necessary to select a design of suitable diameter and slant of the pipe 20 to avoid blockage of the pipe or flooding caused by the liquid flow and splash in the pipe.

As the agitator attached to C-tank 4, D-tank 17 and E-tank, 23, and kind of conventional one such as paddle type, propeller type, turbine type, disc or cone type, reciprocating type, and jet type or ejector type may be used. Additionally a centrifugal pump or a gear pump may be used as the agitating device.

According to this invention, the at least one acidic component in the gas containing such as hydrogen chloride, hykrogen fluoride, hydrogen sulfide, sulfurous acid gas, nitrogen trioxide and so forth may be removed substantially perfectly, and no white fume occurs at all on discharging the processed gas in the atmosphere. Further, it is not necessary to exchange the columns frequently on gas-washing operations. The alkali used in the second step may be used in the first step effectively, and so utilization of th alkali is very effective without it being discarded as waste. The apparatus may be designed compactly, pressure loss may be reduced to a minimum and running cost may be saved, and so the apparatus may be operated as an energy-saving and natural resources-saving type of apparatus. The apparatus according to this invention may be operated simply and carried out with automation easily. Therefore, the process of this invention may be embodied very advantageously in the view of economy in industrial practice.

EXAMPLES

This invention will be further described below by giving examples. These examples aim to explain this invention and never limit the invention, the embodiments of this invention may be modified of course in optional variation if necessary without any limitation so far as these embodiments do not deviate from the gist or scope of this invention.

EXAMPLE 1 AND COMPARATIVE EXAMPLES 1–3

An experiment was carried out for removing at least one acidic component in a gas by using an apparatus where the B-column is mounted on the A-column, as shown in FIG. 1.

As an A-column, as glass fibre-reinforced polyester resin-made cylinder type of column was used having an inner diameter of 15 cm and being charged with commercially available ceramic Raschid. Rings up to 1 mm height. As a B-column, a glass fibre-reinforced polyester resin-made cylinder type of column was used having an inner diameter of 15 cm incorporated with a so-called section (strip) type of demister (30 cm in thickness), molded with overlapped nets of stainless steel (SUS-304) wire, and a mist separator mounted on the column. The A-column and B-column were supported stacked by a steel frame.

An intermediate gas inlet was provided between A-column and B-column with the intermediary gas inlet of the bubble cap plate type being equipped with a dam on the plate to prevent flowing down of the liquid from the B-Column into the A-column and to let only gas ascend upward.

As C-tank, D-tank and E-tank for storing the alkali-containing aqueous solution, respectively, polyvinyl choloride series of synthetic resins-made tank of 50 liters capacity were used. E-tank was positioned high in order to supply the alkali-containing aqueous solution from E-tank to D-tank by means of pressure head difference. To transfer the alkali-containing aqueous solution from D-tank and C-tank, respectivley, into the B-column and the A-column, centrifugal pumps (lifting capacity respectivley 10 liters/min.; maximum lift 27 m) were used with stainless steel (SUS 304) being provided at the portions that contacted with the liquid to be pumped. A polyvinyl chloride series of synthetic resins-made pipe were used. As a nozzle for spraying the alkali-containing aqueous solution in the A-column and the B-column, a stainless steel (SUS 304) made-conical type of nozzle was used having spraying capacity 2 liters/min. and a jet angle of 65° under liquid pressure 1.0 $kg/cm^2G$.

A mist separator (5 cm in thickness, voids 97%) glass constructed by overlapping nets made of stainless steel (SUS 304) wire, was disposed in the vicinity of the top of the B-column in order to completely remove liquid drops from the processed gas. A glass electrode pH meter type of pH control device (upper and lower limits adjusting type) was installed in C-tank. A specific gravity control device (range of measurement 0.2 g/cm and over; upper and lower limits adjusting type) of float type was provided for D-tank and had the portions that contact with liquid to be measured made of stainless steel (SUS 316). In either of D-tank and C-tank, a lead type level switch-equipped level control device (outer diameter 14 mm and length 400 mm of stem) was provided. In the portion of the level control device to be in contact with liquid a material coated with a polyvinyl chloride series of synthetic resins was used. As a solenoid valve disposed in the passage of the alkali-containing aqueous solution, a direct-operated solenoid valve (connecting caliber PT ¼) was used having a fluororesin (trade mark: Teflon) coated over the portions to be contacted with the aqueous solution.

As a blower for gas transfer, a turbo-blower (rated blowing volume 2.5 m /min.; static pressure 240 $mmH_2O$) was used having the gas flow portion made of glass fibre-reinforced polyester resin (FRP). For gas flow piping, polyvinyl chloride series of synthetic resins-made pipes were used.

General-purpose motors made by Mitsubishi Electric Corporation are used as the motors for driving each of the above devices as needed.

For preparing the alkali-containing aqueous solution, sodium hydroxide was dissolved in water and the resultant solution was diluted with water to regulate to the concentration indicated in the following Tables and stored in respective tanks E, D and C. In the beginning of the experiment, there is no problem if the liquid in C-tank is just only water alone. But when the gas begins to flow in these apparatus, the pH of washing liquor moves to the acidic side and an alkali is supplied.

As crude gas sample was used, for example, a mixture of air with the gas evaporated by heating 60–70% nitric acid aqueous solution at 90° C., and nitric acid was supplied continuously into the evaporator. An experiment was carried out for removing the acidic component(s) by washing the acidic component(s)-containing crude gas with the alkali-containing aqueous solution in operations above explained.

The crude gas of the same composition was used with each concentration of the alkali-containng aqueous solution being adjusted within the range according to this invention (Example 1) and adjusted out of the range of this invention (Comparative Examples 1–3). Experiments were carried out respectively on those conditions.

The conditions and the results of the experiments are summarized and shown in Table 1.

The lower limit of the range of determination is the detecting limit and below the limit, detection of a very

TABLE 1

(1) Experiments for Removing Acidic Component(s) contained in Gas

|  |  | Example 1 | Comparative Example 1 | Comparative Example 2 | Comparative Example 3 |
|---|---|---|---|---|---|
| Controlling condition for alkali (NaOH)-containing aqueous solution | C-tank (pH) | 6-8 | 6-8 | 3-4 | 2-3 |
|  | D-tank equivalent concentration (normality) | 0.9 N | 0.20 N | 0.9 N | 0.9 N |
|  | specific gravity to water | 1.04 (15° C.) | 1.00 (15° C.) | 1.04 (15° C.) | 1.04 (15° C.) |
|  | E-tank (equivalent concentration (normality)) | 6.25 N | 6.25 N | 6.25 N | 6.25 N |
| Spraying amount of alkali-containing aqueous solution | A-column | 1-2 L/min | 1-2 L/min | 1-2 L/min | 1-2 L/min |
|  | B-column | 1-2 L/min | 1-2 L/min | 1-2 L/min | 1-2 L/min |
| Blowing amount of crude gas by means of blower |  | 1 m³/min | 1 m³/min | 1 m³/min | 1 m³/min |
| Gas composition | Crude gas | Air added with nitric acid gas HNO₃ 104 ppm | same to the left | same to the left | same to the left |
|  | Processed gas | CO₂ ca. 300 ppm HNO₃ 0.5 ppm | CO₂ ca. 300 ppm HNO₃ 6 ppm | CO₂ ca. 300 ppm HNO₃ 2.5 ppm | CO₂ ca. 300 ppm HNO₃ 5 ppm |
| Observation of processed gas through window |  | No any fume was seen, all clear and transparent. | White fume was seen. | White fume was seen. | Remarkable white fume was seen. |
| Deposition or precipitation of salt at the bottom of B-column |  | not seen | not seen | not seen | not seen |

Various types of gas detectors sold by Kabushiki Kaisha Gastec were used for analysis of the acidic component(s) in the gas. These detectors including ones used in Examples other that Example 1 are listed below.

| Gas for detection | Model | Range of determination |
|---|---|---|
| Carbon dioxide | No. 2LL | 3000-5000 ppm |
| Nitric acid gas | No. 15L | 0.2-40 ppm |
| Hydrogen chloride | No. 14L | 0.2-40 ppm |
| Sulfur dioxide | No. 15La | 0.5-60 ppm |
| Hydrogen fluoride | No. 17 | 0.5-60 ppm |
| Hydrogen sulfide | No. 4LL | 0.5-60 ppm | small amount of gas component is impossible.

EXAMPLES 2 AND 3 AND COMPARATIVE EXAMPLE 4

Experiments were carried out using the same apparatus and the crude gas of the same composition as in Example 1 except varying alkalinity of sodium hydroxide-containing aqueous solution (Example 2 and Example 3). Another experiment was carried out using an alkali aqueous solution out of the range according to this invention and the other operations same as in the above Examples (Comparative Example 4). These conditions and the results are shown in Table 2.

TABLE 2

(1) Experiments for Removing Acidic Component(s) contained in Gas

|  |  | Example 2 | Example 3 | Comparative Example 4 |
|---|---|---|---|---|
| Controlling condition for alkali (NaOH)-containing aqueous solution | C-tank (pH) | 6-8 | 9-13 | 6-8 |
|  | D-tank equivalent concentration (normarity) | 0.5 N | 2.3 N | 3.0 N |
|  | specific gravity to water | 1.02 (15° C.) | 1.10 (15° C.) | 1.13 (15° C.) |
|  | E-tank (equivalent concentration (normality)) | 6 N | 6 N | 6 N |
| Spraying amount of alkali-containing aqueous solution | A-column | 1-2 L/min | 1-2 L/min | 1-2 L/min |
|  | B-column | 1-2 L/min | 1-2 L/min | 1-2 L/min |
| Blowing amount of crude gas by means of blower |  | 1 m³/min | 1 m³/min | 1 m³/min |
| Gas composition | Crude gas | Air added with nitric gas HNO₃ 104 ppm | same to the left | same to the left |
|  | Processed gas | CO₂ ca. 300 ppm HNO₃ 0.7 ppm | CO₂ ca. 300 ppm HNO₃ 0.4 ppm | CO₂ ca. 300 ppm HNO₃ 0.4 ppm |
| Observation of processed gas through window |  | No any fume was seen, all clear and transparent | same to the left | same to the left |
| Deposition or precipitation of salt at the bottom of B-column |  | not seen | not seen | Crystal starts to precipitate and deposit in an elapse of one hour and B-column was blocked after elapse |

TABLE 2-continued

| (1) Experiments for Removing Acidic Component(s) contained in Gas | | | |
|---|---|---|---|
| | Example 2 | Example 3 | Comparative Example 4 |
| | | | of 70 hours. |

EXAMPLE 4–14 AND COMPARATIVE EXAMPLE 5

Experiments were carried out using the same apparatus as in Example 1 and varying the composition of the crude gas. Main conditions and the results of the experiments are shown in Table 3.

TABLE 3

| (3) Experiments for Removing Acidic Component(s) contained in Gas | | | | | | |
|---|---|---|---|---|---|---|
| | | | Example 4 | Example 5 | Example 6 | Example 7 |
| Controlling condition for alkali (NaOH)-containing aqueous solution | C-tank (pH) | | 6–9 | 6–9 | 6–9 | 6–9 |
| | D-tank | equivalent concentration (normality) | 0.9 N | 0.9 N | 0.9 N | 0.9 N |
| | | specific gravity to water | 1.04 (15° C.) | 1.04 (15° C.) | 1.04 (15° C.) | 1.04 (15° C.) |
| | E-tank (equivalent concentration (normality)) | | 6 N | 6 N | 6 N | 6 N |
| Spraying amount of alkali-containing aqueous solution | A-column | | 1–2 L/min | 1–2 L/min | 1–2 L/min | 1–2 L/min |
| | B-column | | 1–2 L/min | 1–2 L/min | 1–2 L/min | 1–2 L/min |
| Blowing amount of crude gas by means of blower | | | 1 m$^3$/min | 1 m$^3$/min | 1 m$^3$/min | 1 m$^3$/min |
| Gas composition | Crude gas | | Air added with nitric gas $HNO_3$ 50 ppm | Air added with hydrogen chloride HCL 48 ppm | Air added with sulfur chloride $SO_2$ 57 ppm | Air added with hydrogen fluoride HF 46 ppm |
| | Processed gas | | $HNO_3$ 0.2 ppm | HCl no detection | $SO_2$ no detection | HF no detection |
| Observation of processed gas through window | | | No any fume was seen, all clear and transparent. | same to the left | same to the left | same to the left |
| Deposition or precipitation of salt at the bottom of B-column | | | not seen | not seen | not seen | not seen |
| | | | Example 8 | Example 9 | Example 10 | Example 11 |
| Controlling condition for alkali (NaOH)-containing aqueous solution | C-tank (pH) | | 6–9 | 6–9 | 6–9 | 6–9 |
| | D-tank | equivalent concentration (normality) | 0.9 N | 0.9 N | 0.9 N | 0.9 N |
| | | specific gravity to water | 1.04 (15° C.) | 1.04 (15° C.) | 1.04 (15° C.) | 1.04 (15° C.) |
| | E-tank (equivalent concentration (normality)) | | 6 N | 6 N | 6 N | 6 N |
| Spraying amount of alkali-containing aqueous solution | A-column | | 1–2 L/min | 1–2 L/min | 1–2 L/min | 1–2 L/min |
| | B-column | | 1–2 L/min | 1–2 L/min | 1–2 L/min | 1–2 L/min |
| Blowing amount of crude gas by means of blower | | | 1 m$^3$/min | 1 m$^3$/min | 1 m$^3$/min | 1 m$^3$/min |
| Gas composition | Crude gas | | Air added with hydrogen sulfide $H_2S$ 59 ppm | Nitrogen added with nitric acid gas $HNO_3$ 48 ppm | Nitrogen added with nitric acid gas $HNO_3$ 108 ppm | Nitrogen added with hydrogen chloride HCL 0.4 ppm |
| | Processed gas | | $H_2S$ no detection | $HNO_3$ no detection | $HNO_3$ 0.5 ppm | HCL 0.4 ppm |
| Observation of processed gas through window | | | No any fume was seen, all clear and transparent. | same to the left | same to the left | same to the left |
| Deposition or precipitation of salt at the bottom of B-column | | | not seen | not seen | not seen | not seen |
| | | | Example 12 | Example 13 | Example 14 | Comparative Example 5 |
| Controlling condition for alkali (NaOH)-containing aqueous solution | C-tank (pH) | | 6–9 | 6–9 | 6–9 | 3–4 |
| | D-tank | equivalent concentration (normality) | 0.9 N | 0.9 N | 0.9 N | 0.9 N |
| | | specific gravity to water | 1.04 (15° C.) | 1.04 (15° C.) | 1.04 (15° C.) | 1.04 (15° C.) |
| | E-tank (equivalent concentration (normality)) | | 6 N | 6 N | 6 N | 6 N |
| Spraying amount of alkali-containing aqueous solution | A-column | | 1–2 L/min | 1–2 L/min | 1–2 L/min | 1–2 L/min |
| | B-column | | 1–2 L/min | 1–2 L/min | 1–2 L/min | 1–2 L/min |
| Blowing amount of crude gas by means of blower | | | 1 m$^3$/min | 1 m$^3$/min | 1 m$^3$/min | 1 m$^3$/min |
| Gas composition | Crude gas | | Nitorogen added | Nitrogen | Nitrogen | Nitrogen |

TABLE 3-continued

| (3) Experiments for Removing Acidic Component(s) contained in Gas | | | | | |
|---|---|---|---|---|---|
| | | with sulfur dioxide $SO_2$ 58 ppm | added with hydrogen fluoride HF 30 ppm | added with hydrogen sulfide $H_2S$ 56 ppm | added with nitric acid gas $HNO_3$ 106 ppm |
| Processed gas | | $SO_2$ 0.5 ppm | HF no detection | $H_2S$ no detection | $HNO_3$ 5 ppm |
| Observation of processed gas through window | | No any fume was seen, all clear and transparent | same to the left | same to the left | White fume was seen. |
| Deposition or precipitation of salt at the bottom of B-column | | not seen | not seen | not seen | not seen |

Crude gas samples containing air or nitrogen mixed with the acidic gas were prepared as follows:

Samples containing hydrogen chloride were prepared by mixing commercially available hydrogen chloride charged in a cylinder (99% purity; produced by Taiyo Sanso Co., Ltd.) into air or nitrogen by means of a gas mixer.

Samples containing sulfur dioxide were prepared by mixing the commercially available sulfur dioxide were prepared by mixing the commercially available sulfur dioxide in a cylinder (99% purity; produced by Taiyo Sanso Co., Ltd.) into air or nitrogen by means of a gas mixer.

Samples containing hydrogen fluoride were prepared by heating 55% hydrofluoric acid aqueous solution at 70° C. and introducing air or nitrogen with bubbling to give the air or nitrogen mixed with evaporated and entrained hydrogen fluoride.

Samples containing hydrogen sulfide were prepared by mixing commercially available hydrogen sulfide charged in a cylinder (99.0% purity; produced by Taiyo Sanso Co., Ltd.) into air or hydrogen by means of a gas mixer.

EXAMPLES 15-18

Experiments were carried out by using an aqueous solution of potassium hydroxide as the alkali-containing aqueous solution and those experiments are shown as Examples 15-18 in Table 4.

TABLE 4

| (4) Experiments for Removing Acidic Component(s) contained in Gas | | | | | | |
|---|---|---|---|---|---|---|
| | | | Example 15 | Example 16 | Example 17 | Example 18 |
| Controlling condition for alkali (NaOH)-containing aqueous solution | C-tank (pH) | | 6-9 | 6-9 | 6-9 | 6-9 |
| | D-tank | equivalent concentration (normality) | 1.1 N | 1.1 N | 1.1 N | 1.1 N |
| | | specific gravity to water | 1.04 (15° C.) | 1.04 (15° C.) | 1.04 (15° C.) | 1.04 (15° C.) |
| | E-tank (equivalent concentration (normality)) | | 6 N | 6 N | 6 N | 6 N |
| Spraying amount of alkali-containing aqueous solution | A-column | | 1-2 L/min | 1-2 L/min | 1-2 L/min | 1-2 L/min |
| | B-column | | 1-2 L/min | 1-2 L/min | 1-2 L/min | 1-2 L/min |
| Blowing amount of crude gas by means of blower | | | 1 m³/min | 1 m³/min | 1 m³/min | 1 m³/min |
| Gas composition | Crude gas | | Air added with nitric acid gas $HNO_3$ 104 ppm | Nitrogen added with nitric acid gas $HNO_3$ 106 ppm | Waste gas from process for manufacturing semiconductors $HNO_3$ 93 ppm HCL 5 ppm HF 10 ppm | Waste gas from process for manufacturing semiconductors $HNO_3$ 50 ppm HCL 10 ppm HF 50 ppm |
| | Processed gas | | $HNO_3$ 0.5 ppm | $HNO_3$ 0.4 ppm | $HNO_3$ 0.5 ppm HCL no detection HF no detection | $HNO_3$ no detection HCL no detection HF no detection |
| Observation of processed gas through window | | | No any fume was seen, all clear and transparent | same to the left | same to the left | same to the left |
| Deposition or precipitation of salt at the bottom of B-column | | | not seen | not seen | not seen | not seen |

EXAMPLE 19-24 AND COMPARATIVE EXAMPLES 6 AND 7

A-column and B-column were constructed separately and independently and connected in series as an apparatus as shown in FIG. 2.

Experiments were carried out for removing the acidic component(s) from the gas by using the apparatus and sodium hydroxide aqueous solution as the alkali-containing aqueous solution.

The parts of the apparatus are common with those in Exmaple 1. But, there are some differences as follows:

Mist separators were put respectively on the top of the A-column and the B-column and the intermediate gas inlet at the bottom of B-column was simplified.

The conditions and the results of the experiments are shown in Table 5.

TABLE 5

(5) Experiments for Removing Acidic Component(s) contained in Gas

| | | Example 19 | Example 20 | Example 21 | Example 22 |
|---|---|---|---|---|---|
| Controlling condition for alkali (NaOH)-containing aqueous solution | C-tank (pH) | 6-9 | 6-9 | 6-9 | 6-9 |
| | D-tank equivalent concentration (normality) | 0.9 N | 0.9 N | 0.9 N | 0.9 N |
| | specific gravity to water | 1.04 (15° C.) | 1.04 (15° C.) | 1.04 (15° C.) | 1.04 (15° C.) |
| | E-tank (equivalent concentration (normality)) | 6 N | 6 N | 6 N | 6 N |
| Spraying amount of alkali-containing aqueous solution | A-column | 1-2 L/min | 1-2 L/min | 1-2 L/min | 1-2 L/min |
| | B-column | 1-2 L/min | 1-2 L/min | 1-2 L/min | 1-2 L/min |
| Blowing amount of crude gas by means of blower | | 1 m$^3$/min | 1 m$^3$/min | 1 m$^3$/min | 1 m$^3$/min |
| Gas composition | Crude gas | Air adding with nitric acid gas $HNO_3$ 108 ppm | Nitrogen added with nitric acid gas $HNO_3$ 102 ppm | Air added with hydrogen chloride HCL 39 ppm | Nitrogen added with hydrogen chloride HCL 40 ppm |
| | Processed gas | $HNO_3$ 0.5 ppm | $HNO_3$ 0.4 ppm | HCL 0.2 ppm | HCL no detection |
| Observation of processed gas through window | | No any fume was seen, all clear and transparent | same to the left | same to the left | same to the left |
| Deposition or precipitation of salt at the bottom of B-column | | not seen | not seen | not seen | not seen |

| | | Example 23 | Example 24 | Comparative Example 6 | Comparative Example 7 |
|---|---|---|---|---|---|
| Controlling condition for alkali (NaOH)-containing aqueous solution | C-tank (pH) | 6-9 | 6-9 | 3-4 | 1-2 |
| | D-tank equivalent concentration (normality) | 0.9 N | 0.9 N | 0.9 N | 2.5 N |
| | specific gravity to water | 1.04 (15° C.) | 1.04 (15° C.) | 1.04 (15° C.) | 1.10 (15° C.) |
| | E-tank (equivalent concentration (normality)) | 6 N | 6 N | 6 N | 6 N |
| Spraying amount of alkali-containing aqueous solution | A-column | 1-2 L/min | 1-2 L/min | 1-2 L/min | 1-2 L/min |
| | B-column | 1-2 L/min | 1-2 L/min | 1-2 L/min | 1-2 L/min |
| Blowing amount of crude gas by means of blower | | 1 m$^3$/min | 1 m$^3$/min | 1 m$^3$/min | 1 m$^3$/min |
| Gas composition | Crude gas | Waste gas from process for manufacturing semiconductors $HNO_3$ 93 ppm HCL 5 ppm HF 10 ppm | Waste gas from process for manufacturing semiconductors $HNO_3$ 50 ppm HCL 10 ppm HF 50 ppm | Air added with nitric acid gas $HNO_3$ 5 ppm | Nitrogen added with nitric acid gas $HNO_3$ 103 ppm |
| | Processed gas | $HNO_3$ 0.5 ppm HCL no detection HF no detection | $HNO_3$ 0.2 ppm HCL no detection HF no detection | $HNO_3$ 5 ppm | $HNO_3$ 4 ppm |
| Observation of processed gas through window | | No any fume was seen, all clear and transparent. | same to the left | White fume was seen slightly. | White fume was seen. |
| Deposition or precipitation of salt at the bottom of B-column | | not seen | not seen | not seen | not seen |

What is claimed is:

1. An apparatus for removing at least one acidic component from a gas comprising:
   a first countercurrent gas-liquid contact absorption device having at least one first gas inlet, at least one first gas outlet, at least one first liquid inlet including a first sprayer means, and at least one first liquid outlet,
   a second countercurrent gas-liquid contact absorption device having at least one second gas inlet connected to said at least one first gas outlet, at least one second gas outlet, at least one second liquid inlet including a second sprayer means, and at least one second liquid outlet,
   gas-introduction means connected to said at least one first gas inlet for introducing a gas having at least one acidic component therein into said first absorption device,
   a first tank means for preparation and supply of high concentration alkali-containing aqueous solution, said first tank means having a first tank outlet,
   a second tank means for preparation and supply of medium concentration alkali-containing aqueous solution, said second tank means having a second tank outlet,
   means directly connecting said first tank outlet to said second tank means including a first controllable valve means,
   first water supply means connected to said second tank means including a second controllable valve means, specific gravity control means operatively associated with said second tank means and connected to said first controllable valve means and said second controllable valve means for controlling the specific gravity of said medium concentration alkali-containing aqueous solution within a range of about 0.3 to about 2.5N by adding high concentration solution thereto, first liquid level control means operatively associated with said second tank means and connected to said second controllable valve means for controlling the level of solution within said second tank means about a predetermined level, first recirculating means connected between said second tank outlet and said at last one second liquid inlet and between said at least one second liquid outlet and said second tank means for circulating said medium concentration alkali-containing aqueous solution through said second absorption device to absorb reamining portions of said at least one acidic component from said gas, said first recirculating means including first pump means disposed between said second tank outlet and said at least one second liquid inlet, a third tank means for preparation and supply of low concentration alkali-containing aqueous solution, said third tank means having a third tank outlet and a waste aqueous solution overflow outlet means for discharging aqueous solution from said third tank means exceeding a second predetermined constant level in said third tank means, second water supply means connected to said third tank means including a third controllable valve means, second liquid level control means operatively associated with said third tank means and connected to said third controllable valve means for controlling the level of solution within said third tank means, means connecting said first recirculating means downstream of said first pump means to said third tank means and having fourth controllable valve means therein for supplying medium concentration solution to said third tank means, pH control means operatively associated with said third tank means and connected to said fourth controllable valve means for controlling the pH of saaid low concentration alkali-containing aqueous solution with in a range of about 6 to about 13 by adding medium concentration solution thereto, second recirculating means connected between said third tank outlet and said at least one first liquid inlet and between said at least one first liquid outlet and said third tank means for circulating said low concentration alkali-containing aqueous solution through said first absorption device to absorb a major portion of said at least one acidic component from said gas, and first, second, and third agitator means in said first, second, and third tank means, respectively.

* * * * *